United States Patent

Räsänen

[19]

[11] Patent Number: 6,118,834
[45] Date of Patent: Sep. 12, 2000

[54] RATE ADAPTATION IN A NON-UNIFORM NON-TRANSPARENT DATA CHANNEL

[75] Inventor: Juha Räsänen, Espoo, Finland

[73] Assignee: Nokia Telecommunications Oy, Espoo, Finland

[21] Appl. No.: 08/894,027

[22] PCT Filed: Dec. 10, 1996

[86] PCT No.: PCT/FI96/00654

§ 371 Date: Oct. 27, 1997

§ 102(e) Date: Oct. 27, 1997

[87] PCT Pub. No.: WO97/22196

PCT Pub. Date: Jun. 19, 1997

[30] Foreign Application Priority Data

Dec. 11, 1995 [FI] Finland ................................ 955944

[51] Int. Cl.$^7$ ............................ H04L 25/36; H04L 25/40; H04L 7/00

[52] U.S. Cl. ........................... 375/372; 375/220; 370/231; 370/235

[58] Field of Search ....................... 375/372, 377, 375/225, 220, 222; 370/914, 232, 229, 465, 249, 231, 235; 341/61

[56] References Cited

U.S. PATENT DOCUMENTS 5,367,534  11/1994  Chou et al. .

FOREIGN PATENT DOCUMENTS 651531  5/1995  European Pat. Off. .
96/36146  11/1996  WIPO .

OTHER PUBLICATIONS

Data Communication Over the Telephone Network, List of Definitions for Interchange Circuits Between Data Terminal Equipment (DTE) and Data Circuit Terminating Equipment (DCE), ITU–T Telecommunication Standardization Sector of ITU, ITU–T Recommendation V.24, Mar. 1993, pp. i–19.

Data Communication Over the Telephone Network, Support Data Terminal Equipments with V–Series Type Interfaces by an Integrated Services Digital Network, CCITT The International Telegraph and Telephone Consultative Committee, Recommendation V.110, Sep. 1992, pp. 1–58.

"European digital cellular telecommunications system (Phase 2); Radio Link Protocol (RLP) for data and telematic services on the Mobile Station—Base Station System (MS–BSS) interface and the Base Station System—Mobile–services Switching Centre (BSS–MSC) interface (GSM 04.22)", European Telecommunication Standard. Source: ETSI TC–SMG Reference: GSM 04.22, ETS 300 563, UDC: 621.396.21, Sep. 1994, pp. 2–63.

European digital cellular telecommunications system (Phase 2): Terminal Adaptation Functions (TAF) for services using asynchronous bearer capabilities (GSM 07.02), European Telecommunication Standard, Source: ETSI TC–SMG Reference GSM 07.02, UDC: 621.396.21, Jul. 1994, pp. 2–21.

*Primary Examiner*—Chi H. Pham
*Assistant Examiner*—Jean B Corrielus
*Attorney, Agent, or Firm*—IP Group of Pillsbury Madison & Sutro LLP

[57] ABSTRACT

Rate adaptation method and equipment in a telecommunication system for data transmission employ a frame-structured data transmission protocol between the telecommunication equipment of the transmitting party and the telecommunication equipment of the receiving party via a non-uniform non-transparent traffic channel or set of traffic channels consisting of a traffic channel section of a higher capacity and a traffic channel section of a lower capacity. The interface between the high capacity and the low capacity traffic channel section is provided with rate adaptation equipment that consists of a data buffer and data buffer control. The data buffer buffers the frames received from the high capacity traffic channel section before they are transmitted to the low capacity traffic channel section. The data buffer control adjusts the filling level of the data buffer by activating, if necessary, data flow control according to the data transmission protocol in the telecommunication equipment of the transmitting party.

10 Claims, 4 Drawing Sheets

Fig. 2 (PRIOR ART)

| | | |
|---|---|---|
| | | FCS |
| 16 bit | 200 bit | 24 bit |

Fig. 3 (PRIOR ART)

| | bit | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| U | | C/R | X | X | 1 | 1 | 1 | 1 | 1 | 1 | P/F | M1 | M2 | M3 | M4 | M5 | X |
| S | | C/R | S1 | S2 | 0 | 1 | 1 | 1 | 1 | 1 | P/F | — N(R) — | | | | | |
| I+S | | C/R | S1 | S2 | | — N(S) — | | | | 1 | P/F | — N(R) — | | | | | |

| S1 | S2 | |
|---|---|---|
| 0 | 0 | RR |
| 0 | 1 | REJ |
| 1 | 0 | RNR |
| 1 | 1 | SREJ |

| M₁ | M₂ | M₃ | M₄ | M₅ | |
|---|---|---|---|---|---|
| 1 | 1 | 1 | 0 | 0 | SABM |
| 0 | 0 | 1 | 1 | 0 | UA |
| 0 | 0 | 0 | 1 | 0 | DISC |
| 1 | 1 | 1 | 0 | 0 | DM |
| 1 | 1 | 0 | 1 | 0 | NULL |
| 0 | 0 | 0 | 0 | 0 | UI |
| 1 | 1 | 1 | 0 | 1 | XID |
| 0 | 0 | 0 | 1 | 1 | TEST |

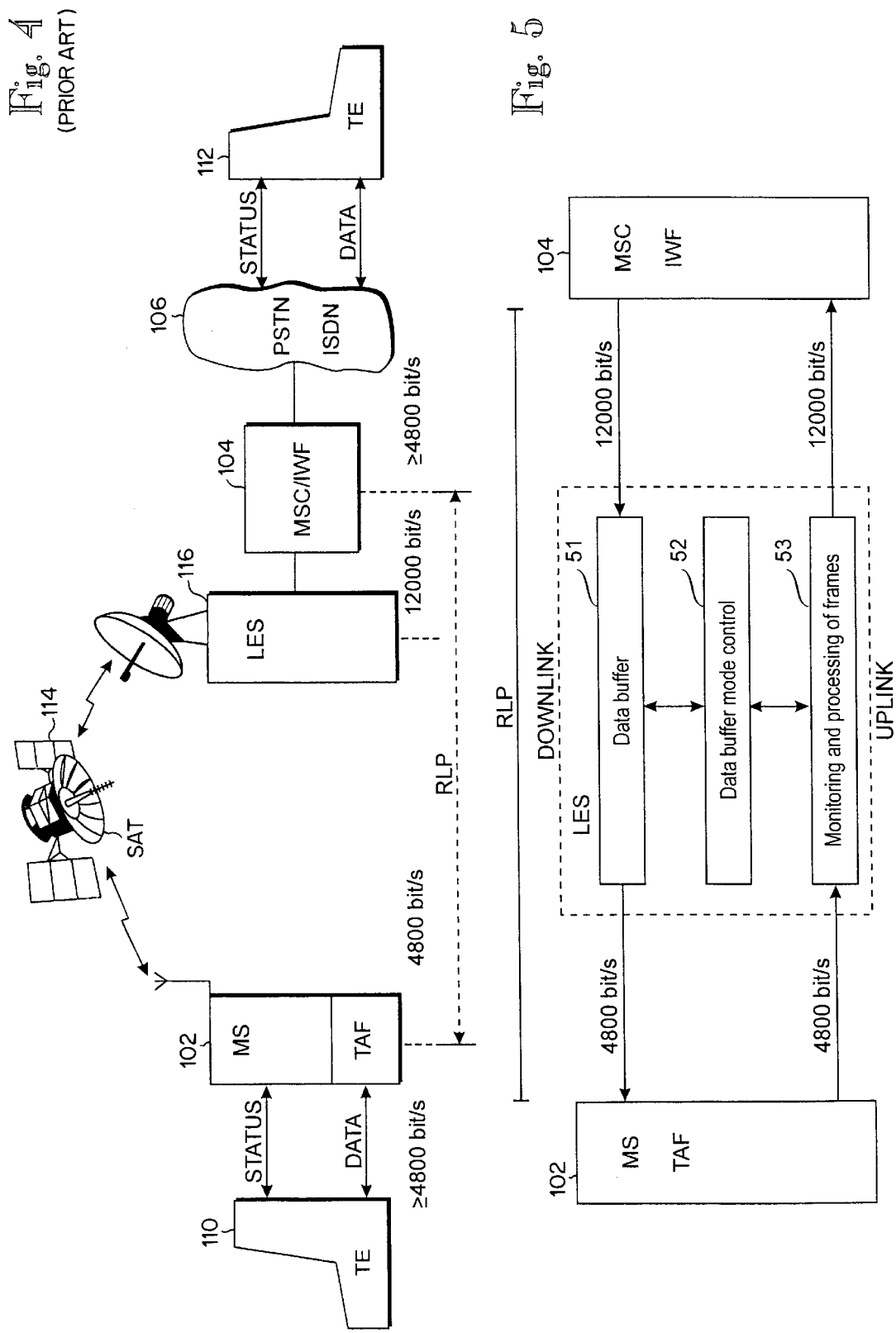

RATE ADAPTATION IN A NON-UNIFORM NON-TRANSPARENT DATA CHANNEL

This application is the national phase of international application PCT/FI96/00654, filed Dec. 10, 1996 which designated the U.S.

FIELD OF THE INVENTION

The invention relates to a rate adaptation method and a rate adapter for a non-uniform non-transparent data transmission channel, especially in mobile systems having a non-standard transmission capacity at the radio interface

BACKGROUND OF THE INVENTION

Mobile systems generally refer to various telecommunication systems that enable private wireless data transmission for subscribers moving within the system. A typical mobile system is a public land mobile network (PLMN). The PLMN comprises fixed radio stations (base stations) located in the service area of the mobile network, the radio coverage areas (cells) of the base stations providing a uniform cellular network. A base station provides in the cell a radio interface (air interface) for communication between a mobile station and the PLMN. Since mobile stations can move in the network and they have access to the PLMN through any base station, the PLMNs are provided with complicated arrangements for subscriber data management, authentication and location management of mobile subscribers, for handovers (a change of a base station during a call) etc. The networks are also provided with services that support the transmission of information other than the usual speech calls (speech service), such as data, facsimile, video image, etc. These new services have required a considerable amount of developmental work and new arrangements in the networks.

Another area of mobile systems includes satellite-based mobile services. In a satellite system, radio coverage is obtained with satellites instead of terrestrial base stations. The satellites are located on an orbit circling the earth and transmitting radio signals between mobile stations (or user terminals UT) and land earth stations (LES). The beam of the satellite provides on the earth a coverage area, i.e. a cell. The coverage areas of individual satellites are arranged to form continuous coverage so that a mobile station is located at all times within the coverage area of at least one satellite. The number of the satellites needed depends on the desired coverage. Continuous coverage on the surface of the earth might require for example 10 satellites.

Subscriber mobility requires similar arrangements in satellite mobile systems as in the PLMNs, i.e. subscriber data management, authentication and location management of mobile subscribers, handovers, etc. The satellite systems should also support similar services as the PLMNs.

One way of implementing these requirements in satellite mobile systems is to use existing PLMN arrangements. In principle this alternative is very simple since a satellite system can be basically compared to a base station system of a mobile system having an incompatible radio interface. In other words, it is possible to use a conventional PLMN infrastructure where the base station system is a satellite system. In such a case, the same network infrastructure could in principle even contain both conventional PLMN base station systems and satellite "base station systems".

There are many practical problems related to the adaptation of the PLMN infrastructure and a satellite system, however. A problem apparent to the Applicant is that a PLMN traffic channel and a traffic channel of a "radio interface" in a satellite system differ considerably. Examine an example where the PLMN is the Pan-European digital mobile system GSM (Global System for Mobile Communication) and the satellite mobile system is the Inmarsat-P system that is currently under development.

A traffic channel in the GSM system supports data transmission at the user rates of 2400, 4800, 7200 and 9600 bit/s. In the future, high-speed data services (HSCSD=High speed circuit switched data) employing two or more traffic channels at the radio interface (multi-slot access) also support higher user rates (14400 bit/s, 19600 bit/s, . . . ). Non-transparent data services also utilize a radio link protocol RLP between a mobile station MS and an interworking function IWF, which is typically situated at a mobile services switching centre MSC. The RLP is a frame-structured balanced (HDLC-type) data transmission protocol. Error correction in the RLP is based on the retransmissions of frames corrupted on the traffic channel, requested by the receiving party. The traffic channel employs channel coding that aims at decreasing the effect of transmission errors. Due to the channel coding and the other overhead information the bit rate at the radio interface will be higher than the actual user rate. The radio interface rates for the user rates of 2400, 4800 and 9600 bit/s are 3600, 6000 and 12000 bit/s, respectively.

The Inmarsat-P satellite system requires that standard data rates up to 4800 bit/s can be transmitted on one traffic channel (e.g. 1200, 2400, 4800 bit/s) and that standard data rates exceeding 4800 bit/s (e.g. 9600, 14400, 19200 bit/s, etc.) can be transmitted by using several parallel traffic channels, such as in the HSCSD service of the GSM system.

In the Inmarsat-P satellite system, the data rate of one traffic channel at the radio interface is at most 4800 bit/s, which equals the user data rate of 4800 bit/s at the terminal interface. In a data service employing two traffic channels the data rate at the radio interface equals the user data rate of 9600 bit/s at the terminal interface. In other words, an end-to-end traffic channel between an MS and an MSC is non-uniform since the capacity of the traffic channel section over the satellite leg is lower than that of the traffic channel section between an LES and the MSC. This non-uniformity of the traffic channel causes the following problems in non-transparent data services employing the RLP protocol.

Firstly, the MSC-IWF transmits data towards the MS at the same rate as data is received from the fixed network, such as the ISDN or the PSTN. In practice, this may signify a data rate of 12000 bit/s in a non-transparent call since the data modem of the IWF may operate in an autobauding mode towards the fixed network. The LES may transmit data that it receives from the MSC-IWF towards the MS at a considerably lower rate, i.e. 4800 bit/s. The MS may easily receive the data that the LES transmits with the lower data rate, but the data begins to accumulate and may be lost at the LES. However, the MSC-IWF continues transmitting at the full rate of 12000 bit/s until a transmission window set in the RLP protocol is full. A transmission window refers to the number of the RLP frames the transmitting party may transmit without receiving acknowledgment from the receiving party.

A similar problem may also occur when other types of radio interfaces are connected to PLMNs, for example wireless telephone systems where the capacity of the traffic channel section at the radio interface is lower than that of the traffic channel section in the remaining part of the PLMN.

SUMMARY OF THE INVENTION

An object of the present invention is to eliminate or alleviate the above-described problem.

The present invention relates to rate adaptation equipment in a telecommunication system for data transmission employing a frame-structured data transmission protocol between the telecommunication equipment of the transmitting party and the telecommunication equipment of the receiving party via a non-uniform non-transparent traffic channel or set of traffic channels consisting of a traffic channel section of a higher capacity and a traffic channel section of a lower capacity. The equipment is characterized in that the rate adaptation equipment is located at an interface between the high capacity and the low capacity traffic channel section and comprises a data buffer that buffers the frames that are received from the high capacity traffic channel section before they are transmitted to the low capacity traffic channel section, data buffer control arranged to adjust the filling level of the data buffer by activating, if necessary, data flow control according to said data transmission protocol in the telecommunication equipment of the transmitting party.

The invention also relates to a rate adaptation method for data transmission employing a frame-structured data transmission protocol between the telecommunication equipment of the transmitting party and the telecommunication equipment of the receiving party via a non-uniform non-transparent traffic channel or set of traffic channels consisting of a traffic channel section of a higher capacity and a traffic channel section of a lower capacity. The rate adaptation method is characterized in that it comprises the steps of buffering, in the data buffer, the frames that are received from the high capacity traffic channel section before they are transmitted to the low capacity traffic channel section, monitoring the filling level of the data buffer, intervening on the data transmission protocol between the telecommunication equipments and activating data flow control according to the data transmission protocol at the transmitting party when the filling level of the data buffer increases to the first threshold value, deactivating the data flow control according to the data transmission protocol in the direction of the transmitting party when the filling level of the data buffer decreases to the second threshold value and the activation of the data flow control is not requested by the receiving party.

In the present invention, between the traffic channel section of a higher capacity and the traffic channel section of a lower capacity there is (e.g. in the downlink direction from the mobile network towards an MS) a data buffer which provides the required rate adaptation by storing data frames received from the high capacity traffic channel section until they can be transmitted via the low capacity traffic channel section. For example, in association with the radio link protocol RLP, the most simple approach would be to design the data buffer to be able to store one RLP window of RLP frames received from the high capacity traffic channel section. This approach would be operative under certain circumstances, but it involves several drawbacks. 1) The long buffering causes a delay that results in the expiration of the RLP retransmission timer at the transmitting end unless the timer has been set to a sufficiently long value in the negotiation at the beginning of the data session. 2) On the other hand, if the timeout of the retransmission timer has been negotiated to a value that is sufficiently long in order to prevent unnecessary retransmissions, the actual error correction, which is based on the retransmission of the frames as the retransmission timer expires, will be slower. It further slows down when the retransmitted frames (as well as the frames that have been transmitted for the first time) must still stay in the retransmission queue at the LES. 3) Additional memory capacity is required at the base station or at an LES of the satellite system. 4) The problems become worse when a high rate multichannel connection is used. In such a case, the larger RLP window requires a longer data buffer and a longer retransmission timer (up to eight times longer, depending on the number of channels over the connection). Over a multichannel connection, this problem may also occur in the other direction (from the MS towards the network) if the radio interface capacity of the multiple channel connection is higher than the transmission channel capacity between a base station or a land earth station and the rest of the PLMN.

Therefore in the preferred embodiment of the invention, the status of the aforementioned data buffer is monitored and the data transmission protocol, e.g. the radio link protocol that operates between the transmitting party and the receiving party, is interrupted and RLP flow control is activated towards the transmitting RLP party. In other words, the data buffer is arranged to buffer data that is received from the high capacity traffic channel section and to transmit data to the low capacity traffic channel at the data rate supported by the latter one. In the normal mode, the RLP frames are forwarded through the data buffer without modification. If the data buffer fills up to a preset threshold value, the unit that controls the data buffer, for example a base station or an LES of the satellite system, interrupts the radio link protocol between the transmitting and the receiving party and initiates an RLP flow control mode. This is achieved by transmitting a "receiver not ready (RNR)" radio link protocol frame towards the transmitting party. The transmitting party stops transmitting the RLP frames when the flow control mode is active. In such a case, no more frames are received at the data buffer but it can be emptied with a rate enabled by the low capacity traffic channel. On the other hand, when the flow control mode is active, "receiver ready (RR)" frames possibly obtained from the receiving party cannot be forwarded to the transmitting party since this would cancel the flow control mode. The unit controlling the data buffer must convert the possible RR frames into RNR frames so that the acknowledgment procedure of the RLP frames would not be disturbed. The unit controlling the data buffer also monitors the RLP frames, which are transmitted from the receiving party to the transmitting party, in order to follow the acknowledgment situation of the frames and to detect whether the receiving party transmits an RNR frame for some other reason. When the data buffer is emptied to the lower threshold value, the unit controlling the data buffer checks whether the receiving party has transmitted an RNR frame that it has not cancelled with a subsequent RR frame. If such an RNR mode initiated by the receiving party is not active, the unit controlling the data buffer again intervenes on the RLP protocol between the receiving and the transmitting party and transmits to the transmitting party an RR frame, i.e. it cancels the RLP flow control mode. If the RNR mode that the receiving party has initiated is active, the unit controlling the data buffer does not interrupt the RLP protocol but it prepares to let all the subsequent RR frames pass from the receiving party to the transmitting party.

The invention overcomes the problem of rate adaptation in a non-uniform traffic channel where the different sections of the connection have different data transmission capacities and where an error correction protocol is used throughout this non-uniform traffic channel. The invention prevents the excessive accumulation of data at the interface of the traffic channel sections by using buffering which can be maintained rather minor, however, by monitoring the filling level of the buffer and by initiating, if required, a flow control mode at the transmitting end.

BRIEF DESCRIPTION OF THE DRAWINGS

In the following, the invention will be described by means of preferred embodiments with reference to the accompanying drawings, in which FIG. 2 shows the structure of an RLP frame, FIG. 3 shows the format of a header in an RLP frame, FIG. 4 is a block diagram illustrating how the Inmarsat-P satellite system is connected as a base station system to a GSM-based mobile system, FIG. 5 is a functional block diagram illustrating the buffer equipment according to the invention.

PREFERRED EMBODIMENTS OF THE INVENTION

The present invention can be applied for data transmission through any traffic channel consisting of two or more sections of different transmission rates. The preferred embodiments of the invention will be described by using as an example the interworking between a GSM-based mobile system and the Inmarsat-P satellite system connected thereto as a "base station system". However, the invention is not to be restricted to these systems.

The structure and operation of the GSM mobile system are well known to a person skilled in the art and they are defined in the GSM specifications of the ETSI (European Telecommunications Standards Institute). Reference is also made to *GSM System for Mobile Communication* by M. Mouly and M. Pautet (Palaiseau, France, 1992, ISBN:2-9507190-0-7). GSM-based mobile systems include DCS1800 (Digital Communication System) and the US digital cellular system PCS (Personal Communication System).

Figure 1:
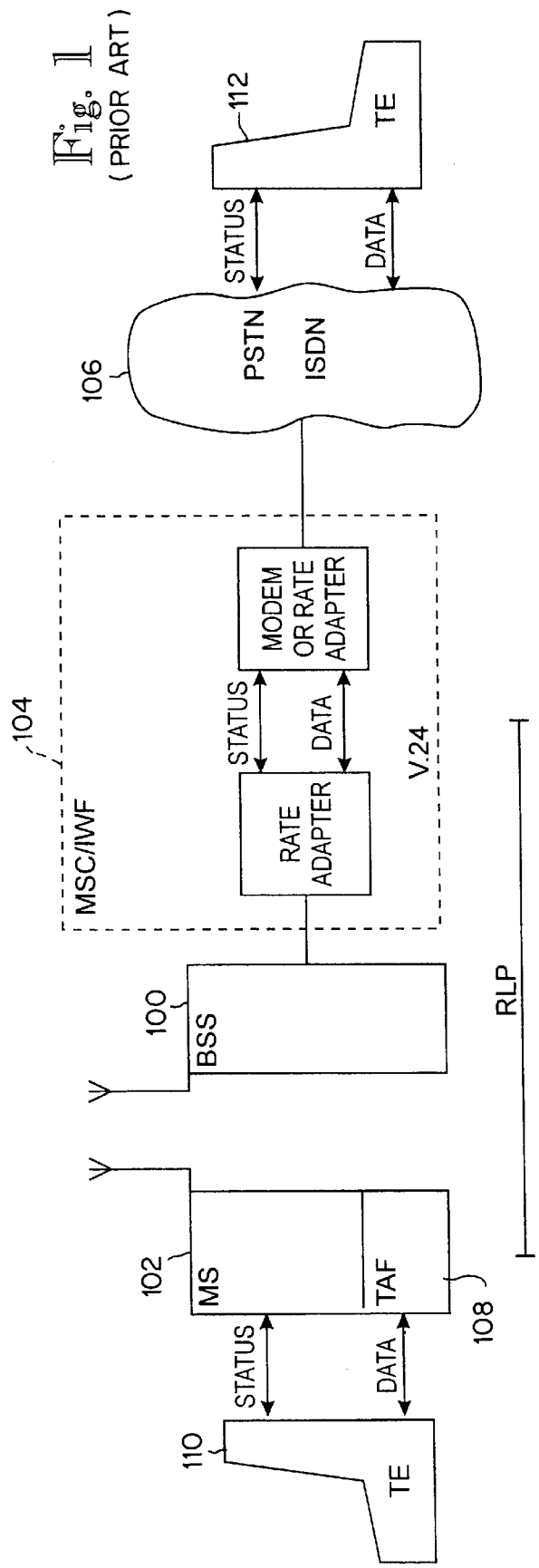
FIG. 1 is a block diagram illustrating a configuration according to the GSM recommendations for data transmission.

The configuration according to the GSM recommendations for data transmission is illustrated in FIG. 1. The basic structure of the GSM mobile system is shown in FIG. 1. The GSM structure comprises two parts: a base station system BSS 100 and a network subsystem NSS. The BSS 100 and the MSs 102 communicate via radio connections. In the BSS, each cell is serviced by a base station BTS (not shown in the figure). A number of base stations are connected to a base station controller BSC (not shown in FIG. 1) the function of which is to control the radio frequencies and channels used by the BTS. The BSSs are connected to an MSC 104. Certain MSCs are connected to other telecommunication networks, such as the public switched telephone network PSTN and the ISDN 106.

In the GSM system, a data connection 108 is established between a terminal adaptation function TAF of an MS and an IWF in the mobile network (usually in the MSC). In data transmission occurring in the GSM network, this connection is a V.110 rate-adapted, UDI-coded digital full-duplex connection that is adapted to V.24 interfaces. The V.110 connection described herein is a digital transmission channel that was originally developed for ISDN (Integrated Services Digital Network) technology, that is adapted to the V.24 interface, and that also provides the possibility of transmitting V.24 statuses (control signals). The CCITT recommendation for a V.110 rate-adapted connection is disclosed in the CCITT Blue Book: V.110. The CCITT recommendation for a V.24 interface is disclosed in the CCITT Blue Book: V.24. The TAF 108 adapts the data terminal TE 110 connected to the MS to the aforementioned GSM V.110 data connection which is established over a physical connection utilizing one or several traffic channels (HSCSD). The IWF comprises a rate adapter that adapts the GSM V.110 data connection to the V.24 interface, and a data modem or another rate adapter depending on whether the connection is extended to the PSTN or the ISDN. In the ISDN or the PSTN, a data connection is established for example to another TE. The V.24 interface between the MS and the TE is called here a terminal interface. A corresponding terminal interface is also located in the IWF as well as in the other TE 112 in the ISDN or the PSTN.

A GSM traffic channel supports data transmission with the user rates of 2400, 4800, 7200 and 9600 bit/s. In the future, high-speed data services (HSCSD=High speed circuit switched data) employing two or more traffic channels at the radio interface (multi-slot access) also support higher user rates (14400 bit/s, 19600 bit/s, . . . ). The traffic channel employs channel coding that aims at decreasing the effect of transmission errors. The channel coding and the various overhead information increase the bit rate at the radio interface higher than the actual user rate. The radio interface rates corresponding to the user rates of 2400, 4800 and 9600 bit/s are 3600, 6000 and 12000 bit/s.

Non-transparent data services also employ a radio link protocol RLP between an MS and an IWF. The IWF is typically situated at the MSC. The RLP is a frame-structured balanced (HDLC-type) data transmission protocol that is described in the GSM recommendation 04.22. More precisely, data is transmitted between the TAF and the IWF in the RLP frames of FIG. 2. FIG. 3 shows the format of the header field. The parameters of the header are disclosed in the GSM recommendation 04.22. The RLP frame has a fixed length of 20 bits that consists of a header (16 bits) and an information field (200 bits) and a frame check sequence (FCS) (24 bits). The error correction in the RLP is based on the retransmission of frames corrupted on the traffic channel, requested by the receiving party. Therefore the transmitted RLP frames are stored in the transmitting end until an acknowledgment is received from the receiving end. If the transmitting end does not receive an acknowledgment or receives a negative acknowledgment, the transmitting end repeats the transmission a predetermined number of times. The number of retransmissions is restricted by a parameter N2 so that endless transmission loops due to a very poor connection are avoided. The transmission of the RLP frame is repeated when a preset time T1 has elapsed since the preceding transmission. In order to decrease the amount of buffering required in the transmitting end, a sliding window is used for acknowledgment. This means that the transmitting party may transmit several frames before an acknowledgment is required from the receiver. The RLP window therefore represents a sliding group of frames that have already been transmitted but that have not been acknowledged. The size of the window (the number of frames) is determined by a parameter W. The RLP parties negotiate the values of the parameters N2, T1 and WS at the beginning of the session.

The RLP protocol also comprises flow control which is used to adjust the filling level of the transmission and reception buffers in the TAF and the IWF. This flow control is described for example in the GSM recommendation 07.02. The receiving RLP party (TAF or IWF) immediately transmits a "flow control active" indication to the transmitting party (IWF or TAF) if the reception buffer from the radio path reaches a predetermined threshold value, or if the TE has initiated local flow control at the terminal interface. In the last case, when the TAF receives from the terminal interface this flow control indication, it interrupts the data transmission from the reception buffer to the terminal interface. When the buffer disabled mode or the local flow control is eliminated, the TAF/IWF transmits a "flow control inactive" indication. Also, the data transmission from the reception buffer is reactivated. The transmitting party activates the local flow control immediately when the transmission buffer reaches a predetermined threshold value or when it receives a "flow control active" indication from the receiving party. When the buffer disabled mode is terminated or when the "flow control inactive" indication is received, the IWF/TAF removes the local flow control. The transmission buffer buffers the data received from the V.24 interface in such a way that data is not lost if the MS is not able to transmit data immediately over the radio path. The reception buffer buffers the data that is transmitted to the V.24 interface in such a way that the data received from the traffic channel is not lost if it cannot be immediately forwarded via the V.24 interface, for example to the TE. The aforementioned predetermined threshold value that activates the flow control is for example a transmission or a reception buffer that is half full.

The "flow control active" indication is an RLP frame that comprises in the header field "RNR (receiver not ready)" coding, i.e. bits S1S2=10. This frame is called an RNR frame. The "flow control inactive" indication is an RLP frame comprising in the header field "RR (receiver ready)" coding, i.e. bits S1S2=00. This frame is called an RR frame.

In FIG. 4, the Inmarsat-P satellite system 114 is connected as a base station system to a GSM-based mobile system. In the Inmarsat satellite system, radio coverage is obtained by satellites instead of base stations located on the ground, the satellites being on an orbit circling the earth and transmitting radio signals between MSs (or user terminals UT) and LESs 116. The beam of the satellite forms a coverage area, i.e. a cell, on the earth. The coverage areas of individual satellites are arranged to form continuous coverage so that an MS is at all times located within the coverage area of at least one satellite. The number of the satellites required depends on the desired coverage. Continuous coverage on the surface of the earth might require for example 10 satellites. FIG. 4 shows, for the sake of clarity, only one LES 116, one satellite SAT 114 and one MS 102. The LES is connected to the MSC of the GSM network in the same way as the BSS in FIG. 1. Also the GSM protocols between the MSC and the LES are the same as between the MSC and the BSS in FIG. 1 (GSM V.110). The terminal interface is also the same as in FIG. 1. The difference is that in FIG. 4 the GSM V.110 connection is not used over the entire connection between the MSC and the MS but the radio interface between the LES and the MS uses the Inmarsat protocols and traffic channels.

A radio interface consists of a bidirectional satellite radio connection between an MS and an LES. The exact structure or operation of the units SAT, LES and MS in the satellite system or the accurate specifications of the radio interface are not relevant to the present invention. The invention does not require changes in the actual satellite system the details of which can be obtained from the Inmarsat specifications. The only feature essential to the invention is the capacity of the traffic channel formed over the radio interface. In other words, in the Inmarsat-P system the maximum data rate of a traffic channel is 4800 bit/s, whereas in the GSM network section the maximum data rate of the traffic channel is 12000 bit/s. Therefore the end-to-end traffic channel between the TAF and the IWF is non-uniform which causes the above-described problem, i.e. the accumulation of data at the LES.

A similar problem may also occur in other systems where the traffic channels are non-uniform, i.e. the traffic channel capacity is different at the radio interface than in the other parts of the network.

This is overcome according to the invention by providing a network unit, such as an LES of a satellite system or a BTS of a radio system, which is situated at the interface of traffic channel sections of different capacities, with a data buffer that provides the required rate adaptation. The degree of use of the data buffer is monitored and adjusted by utilizing the end-to-end RLP protocol that operates between the transmitting and the receiving party. This is performed by activating the RLP data flow control in the direction of the transmitting RLP party by means of RNR frames when the buffer is full and by deleting the data flow control activation by means of RR frames when the buffer is empty. It should be noted that the present invention does not require any changes in either RLP unit, such as an IWF and a TAF. The exact implementation of the units is therefore not essential to the invention and will not be described in greater detail in the present application. Instead, the present invention utilizes the existing feature of the RLP protocol, i.e. data flow control. The data flow control according to the invention is based entirely on a new type of use of RR and RNR frames. The transmitting and the receiving RLP unit are not aware of the interruption of the end-to-end protocol and the use of the frames on the traffic channel. Instead, they assume that they interchange frames according to the protocol directly between them. Therefore it is only necessary to describe the operation according to the invention carried out by the network unit situated between the parties in order to understand and implement the present invention.

FIG. 5 illustrates the implementation of the invention at an LES of a satellite system. FIG. 5 only shows the functional blocks that are essential to the invention. In FIG. 5, the downlink direction is the transmission direction from the IWF to the TAF and the uplink direction is the opposite direction. The LES comprises a data buffer 51 that receives RLP frames from the IWF via a GSM traffic channel having the rate of 12000 bit/s. The data buffer 51 buffers the received RLP frames in order to transmit them to the TAF via an Inmarsat-P traffic channel at the rate of 4800 bit/s. The LES also comprises data buffer mode control that adjusts the filling level of the data buffer 51 in the manner according to the invention. The LES also comprises a unit 53 for monitoring and processing the frames, the unit receiving uplink RLP frames from the TAF at the rate of 4800 bit/s. The unit 53 forwards the information about the frame type to the control unit 52 and transmits the frames to the IWF at the rate of 12000 bit/s either as such or in a modified form, as will be described in greater detail below.

Figure 6:
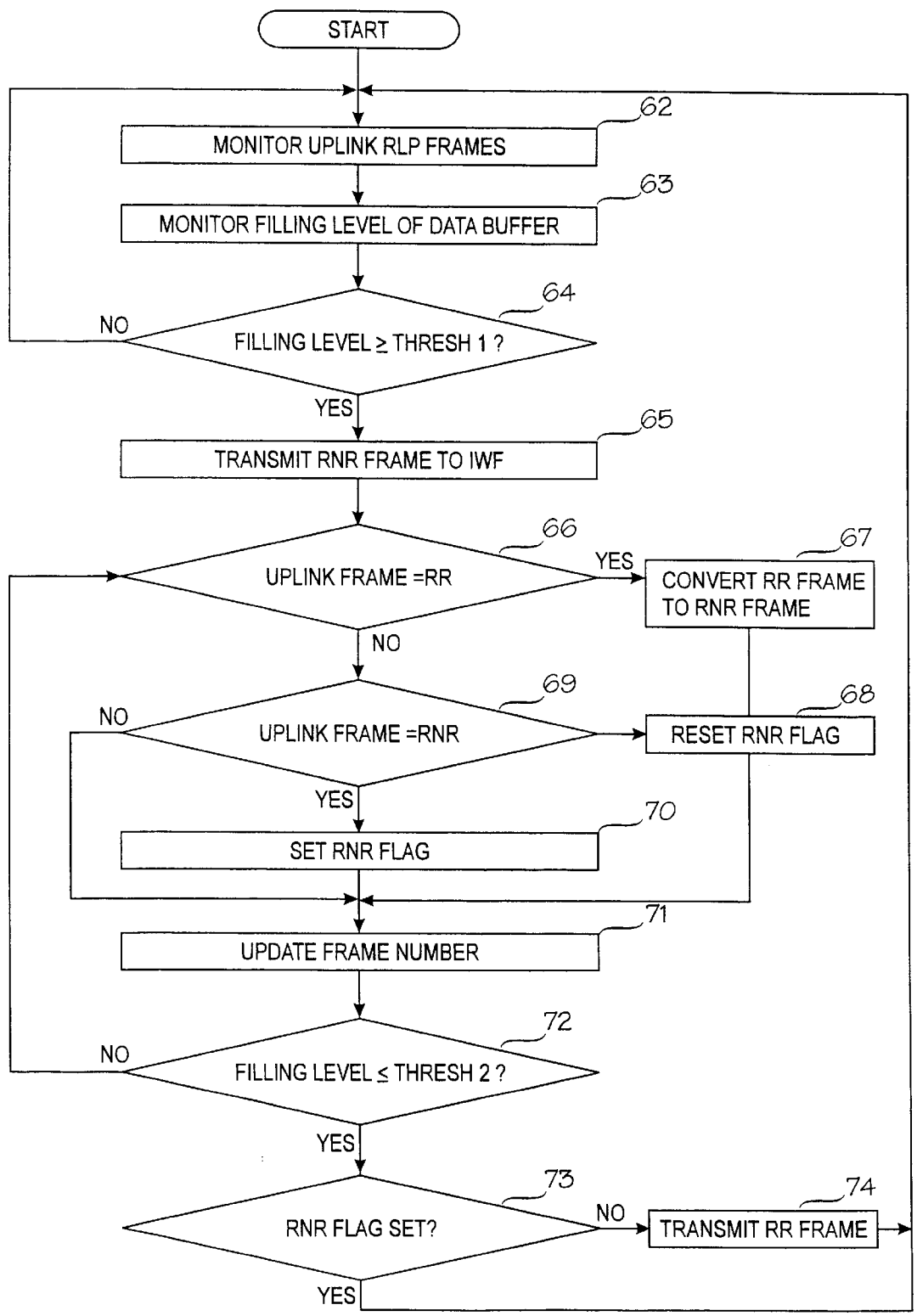
FIG. 6 is a flow chart illustrating the operation of the buffer equipment of FIG. 5.

The operation of the equipment of FIG. 5 will be described below with reference to FIG. 6. FIG. 6 is a flow chart illustrating the operation of the unit 52 in the mode control of the data buffer 51.

Assume first that the data buffer 51 is given a higher threshold value THRESH1 and a lower threshold value THRESH2 that describe the filling level of the data buffer. Each threshold value corresponds to a preset number of RLP frames in the data buffer, for example. Assume also that the data buffer 51 is in the normal operating mode. In other words, the filling level of the data buffer is between THRESH1 and THRESH2, and the data flow control according to the invention is not active.

With reference to FIG. 6, the control unit 52 monitors the uplink RLP frames that the TAF transmits to the IWF. More particularly, the frame monitoring and processing unit 53, for example buffer storage, captures the frame, reads the frame number and forwards the frame number to the control unit 52. The control unit 52 stores in its memory the latest acknowledged frame number. In this manner, the control unit 52 is able to monitor the acknowledgment situation of the frames.

The control unit 52 also monitors the filling level of the data buffer 51 (steps 63 and 64). If the filling level of the buffer has not reached the higher threshold value THRESH1, the process moves from step 64 back to step 62. If the data buffer 51 has filled up to the threshold value THRESH1, the control unit 52 intervenes on the RLP protocol between the TAF and the IWF and activates data flow control in the IWF. This takes place in such a way that the control unit 52 commands the frame monitoring and processing unit 53 to transmit an RNR frame comprising the latest acknowledged frame number to the IWF. When the IWF receives the RNR frame it stops transmitting data frames in the downlink direction to the data buffer 51 and activates the local data flow control according to the GSM recommendation 07.02. However, the data buffer 51 continues transmitting the RLP frames in the downlink direction to the TAF, which results in the data buffer being gradually emptied. The TAF simultaneously continues transmitting the RLP frames in the uplink direction according to the RLP protocol. In order to avoid error situations, the control unit 52 must monitor whether the uplink frames comprise RR or RNR frames. For this purpose, the frame monitoring and processing unit 53 buffers each uplink frame until the control unit 52 has analyzed and possibly modified it.

If the control unit 52 detects that the uplink frame is an RR frame (step 66), it converts the frame into an RNR frame (step 67) and resets the RNR flag (step 68). The purpose of this conversion of the frame type is to prevent the RR frames from eliminating the local data flow control in the IWF before the data buffer 51 has been emptied sufficiently. The procedure then moves on to step 71.

If the result of the analysis in step 66 was that the uplink frame is not an RR frame, the control unit 52 analyzes in step 69 whether it is an RNR frame. If the frame is an RNR frame, an RNR flag, which is maintained by the control unit 52 in its memory, is set (step 70). The RNR flag indicates that the TAF itself has transmitted the RNR frame in order to activate the local flow control in the IWF. The RNR frame is set until the next RR frame resets it in step 68.

The process proceeds from step 70 to step 71. Step 69 is also followed directly by step 71 if the uplink frame is not an RNR frame. In step 71, the frame number in the memory of the control unit 52 is updated and the uplink frame is forwarded to the IWF.

In step 72, the control unit 52 checks whether the filling level of the data buffer 51 has decreased to the lower threshold value THRESH2. If it has not, the process returns to step 66. If it has, it is checked in step 73 whether the RNR flag has been set. If it has not been, an RR frame provided with the latest acknowledged frame number is transmitted to the IWF (step 74). This terminates the local data flow control that was activated by the control unit 52 in order to empty the data buffer 51. The process then returns to step 62.

If it is detected in step 73 that the RNR flag has been set, it indicates that the TAF has also activated the local data flow control in the IWF. Therefore the process moves directly from step 73 to step 62 so that the data flow control in the IWF continues until the TAF transmits an RR frame.

The invention has been described above applied in the downlink direction. Corresponding rate adaptation may also be needed in the uplink direction for example in connection with HSCD services. In such a case, it is possible to allocate at the radio interface such a number of traffic channels that their total data rate is higher than the maximum data rate of 12000 bit/s for one GSM traffic channel. The traffic channels of the radio interface thus form the aforementioned traffic channel section of a higher capacity and the GSM traffic channel forms the traffic channel section of a lower capacity. The result is that the uplink RLP frames accumulate at the LES. This problem is eliminated in the same manner as described above in the downlink direction. In this case, the local data flow control is activated in the TAF and the frames transmitted by the IWF are monitored and processed.

In general, the figures and the description related thereto are only intended to illustrate the present invention. The details of the invention may vary within the scope and spirit of the appended claims.

I claim:

1. Rate adaptation equipment in a telecommunication system for data transmission employing a frame-structured end-to-end data transmission protocol between telecommunication equipment of a transmitting party and telecommunication equipment of a receiving party over a non-uniform non-transparent traffic channel or set of traffic channels consisting of a traffic channel section of a higher capacity and a traffic channel section of a lower capacity, the rate adaptation equipment being located at an interface between the higher capacity and the lower capacity traffic channel sections and comprising:

a data buffer that buffers frames received from the higher capacity traffic channel section before the frames are transmitted to the lower capacity traffic channel section; and data buffer control arranged to adjust a filling level of the data buffer by intervening on the frame-structured end-to-end transmission protocol and activating, based on the filling level of the data buffer, data flow control according to said data transmission protocol over said traffic channel section of higher capacity in the telecommunication equipment of the transmitting party, said data buffer control being arranged to pass the end-to-end protocol through the rate adaptation equipment without intervention otherwise, wherein:

the data buffer control is arranged to convert acknowledgement frames of a second frame type, transmitted by the receiving party, into acknowledgement frames of a first frame type before forwarding the acknowledgement frames to the transmitting party when the data flow control is activated.

2. Rate adaptation equipment according to claim 1, wherein the telecommunication system comprises a mobile network having a radio interface formed by a satellite system, and wherein the satellite system comprises at least one land earth station connected as a base station system to a mobile services switching centre of the mobile network in such a way that a traffic channel of the mobile network, providing said high capacity traffic channel section, is used between the land earth station and the mobile services switching centre, the radio interface is provided between the land earth station and a mobile station through a satellite repeater, said radio interface employing the traffic channel of the satellite system which provides said low capacity traffic channel section, and the rate adaptation equipment is located at the land earth station of the satellite system.

3. Rate adaptation equipment according to claim 1, wherein the telecommunication system comprises a mobile network having a radio interface provided by a satellite system, and the satellite system comprises at least one land earth station connected as a base station system to a mobile services switching centre of the mobile network in such a way that a traffic channel or a set of traffic channels of the mobile network, providing said low capacity traffic channel section, is employed between the land earth station and the mobile services switching centre, the radio interface is provided between the land earth station and a mobile station through a satellite repeater, said radio interface employing a set of traffic channels of the satellite system, said set of traffic channels providing said high capacity traffic channel section, and the rate adaptation equipment is located at the land earth station of the satellite system.

4. Rate adaptation equipment according to claim 1, wherein the first and the second telecommunication equipment comprise a terminal adaptation function of the mobile station and an interworking function of the mobile network.

5. Rate adaptation equipment according to claim 4, wherein the data transmission protocol is a radio link protocol, such as a radio link protocol according to the GSM recommendation 04.22.

6. Rate adaptation equipment according to claim 5, wherein said local flow control is flow control according to the GSM recommendation 07.02.

7. Rate adaptation equipment in a telecommunication system for data transmission employing a frame-structured end-to-end data transmission protocol between telecommunication equipment of a transmitting party and telecommunication equipment of a receiving party over a non-uniform non-transparent traffic channel or set of traffic channels consisting of a traffic channel section of a higher capacity and a traffic channel section of a lower capacity, the frame-structured data transmission protocol comprising a data flow control that is activated in the telecommunication equipment of the transmitting party in response to a frame of a first frame type transmitted by the receiving telecommunication equipment, and it is terminated in response to receiving a frame of a second frame type, the rate adaptation equipment being located at an interface between the higher capacity and the lower capacity traffic channel sections and comprising:

a data buffer that buffers frames received from the higher capacity traffic channel section before they are transmitted to the lower capacity traffic channel section;

a data buffer control being arranged to monitor the filling level of the data buffer and acknowledgment frames that the receiving party transmits to the transmitting party, the data buffer control being arranged to intervene on said data transmission protocol between the telecommunication equipment and to activate said local data flow control in the telecommunication equipment of the transmitting party by transmitting a frame of a first frame type when the filling level of the data buffer increases to a first threshold value, the data buffer control being arranged to convert acknowledgement frames of a second frame type, transmitted by the receiving party, into acknowledgement frames of the first frame type before they are forwarded to the transmitting party when said local flow control is active, and the data buffer control being arranged to eliminate said activation of data flow control by transmitting a frame of the second frame type when the filling level of the data buffer decreases to a second threshold value.

8. Rate adaptation equipment according to claim 7, wherein:

the data buffer control is arranged to register the latest frame number that the receiving party has acknowledged with an acknowledgement frame, and the data buffer control is arranged to insert the registered latest acknowledgement number into the transmitted frames in order to activate or eliminate the data flow control.

9. Rate adaptation equipment according to claim 7, wherein:

the data buffer control is arranged not to eliminate the activation of the data flow control even though the filling level of the data buffer decreases to said second threshold value, if the receiving party has transmitted, during the data flow control activated by the data buffer control, a frame of the first frame type which has not been acknowledged by means of a frame of the second frame type.

10. A rate adaptation method for data transmission employing a frame-structured end-to-end data transmission protocol between telecommunication equipment of a transmitting party and telecommunication equipment of a receiving party via a non-uniform non-transparent traffic channel or set of traffic channels consisting of a traffic channel section of a higher capacity and a traffic channel section of a lower capacity, said rate adaptation method comprising:

buffering, in a data buffer, frames received from the higher capacity traffic channel section before they are transmitted to the lower capacity traffic channel section, monitoring a filling level of the data buffer, intervening on the end-to-end data transmission protocol between the telecommunication equipment and activating data flow control according to the data transmission protocol towards the traffic channel section of higher capacity in the direction of the transmitting party when the filling level of the data buffer increases to a first threshold value, sending frames from the data buffer over the traffic channel section of lower capacity to the receiving party, while the data flow control towards the traffic channel section of higher capacity is activated, deactivating the data flow control according to the data transmission protocol towards the traffic channel section of higher capacity in the direction of the transmitting party when the filling level of the data buffer decreases to a second threshold value and the activation of the data flow control is not requested by the receiving party, and converting acknowledgement frames of a second frame type, transmitted by the receiving party, into acknowledgement frames of a first frame type before forwarding the acknowledgement frames to the transmitting party when the data flow control is activated.

* * * * *